United States Patent
Rodriquez et al.

(10) Patent No.: US 12,370,837 B2
(45) Date of Patent: Jul. 29, 2025

(54) TIRE TREAD WITH IMPROVED SIPE ON THREE LEVELS AND TIRE

(71) Applicant: Bridgestone Europe NV/SA [BE/BE], Zaventem (BE)

(72) Inventors: Guiseppe Rodriquez, Rome (IT); Pasquale Agoretti, Rome (IT); Antonio Tirone, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

(21) Appl. No.: 18/266,326

(22) PCT Filed: Dec. 15, 2021

(86) PCT No.: PCT/EP2021/085978
§ 371 (c)(1),
(2) Date: Jun. 9, 2023

(87) PCT Pub. No.: WO2022/129218
PCT Pub. Date: Jun. 23, 2022

(65) Prior Publication Data
US 2024/0042803 A1 Feb. 8, 2024

(30) Foreign Application Priority Data
Dec. 18, 2020 (IT) .................... 102020000031364

(51) Int. Cl.
*B60C 11/12* (2006.01)
(52) U.S. Cl.
CPC .......................... *B60C 11/1259* (2013.01)

(58) Field of Classification Search
CPC ............ B60C 11/1281; B60C 11/1263; B60C 11/1218; B60C 11/12; B60C 11/1259; B60C 11/1204; B60C 11/124; B60C 2011/1213
See application file for complete search history.

(56) References Cited

U.S. PATENT DOCUMENTS

| | | |
|---|---|---|
| 4,994,126 A | 2/1991 | Lagnier |
| 2002/0017349 A1 | 2/2002 | Lopez |
| 2010/0243119 A1* | 9/2010 | Miyazaki ............ B60C 11/1281 152/209.18 |
| 2012/0132337 A1 | 5/2012 | Toulemont et al. |
| 2016/0297248 A1 | 10/2016 | Warfford et al. |

(Continued)

FOREIGN PATENT DOCUMENTS

| | | | |
|---|---|---|---|
| EP | 564435 A1 * | 10/1993 | ............. B60C 11/12 |
| EP | 2138330 A1 | 12/2009 | |

(Continued)

OTHER PUBLICATIONS

International Search Report, corresponding application No. PCT/EP2021/085978, May 9, 2022, 5 pages.

*Primary Examiner* — Cedrick S Williams
(74) *Attorney, Agent, or Firm* — Patterson Intellectual Property Law, PC (57) ABSTRACT

The present invention relates to a tread for tyres. Specifically, it refers to a tread that features a 3-level tread geometry that is optimised in such a way as to ensure long-term high performance on wet and/or snow-covered surfaces, whilst maintaining the handling characteristics and braking capacity on dry and/or smooth surfaces under new tyre conditions.

8 Claims, 6 Drawing Sheets

(56) References Cited

U.S. PATENT DOCUMENTS

2018/0312006 A1\* 11/2018 Bonnet .................. B60C 9/0064
2022/0219492 A1\* 7/2022 Ohsawa .............. B60C 11/1236

FOREIGN PATENT DOCUMENTS

| JP | 02227306 A | | 9/1990 |
|----|------------|---|--------|
| JP | 2000094908 A | | 4/2000 |
| JP | 2013133084 A | \* | 7/2013 |

\* cited by examiner

PRIOR ART

FIG.5A — STATIC CONDITION

FIG.5B — LADEN CONDITION

FIG.5C — SLIDING CONDITION

FIG.6

| Item | Range [% of P] | | Preferable Range [% of P] | |
| --- | --- | --- | --- | --- |
| | Min. Dimension [% of P] | Max. Dimension [% of P] | Min. Dimension [% of P] | Max. Dimension [% of P] |
| A | 40% | 60% | 40% | 55% |
| B | 40% | 60% | 40% | 55% |
| C | 0% | 25% | 5% | 15% |
| $t_1$ | 4% | 8% | 4% | 5% |
| $t_3$ | 4% | 53% | 5% | 27% |
| $x_1$ | 13% | 27% | 16% | 21% |
| $y_1$ | 13% | 27% | 16% | 21% |
| $a_s$ | 8% | 24% | 13% | 19% |
| $a_d$ | 8% | 24% | 13% | 19% |
| $b_s$ | 13% | 35% | 21% | 27% |
| $b_d$ | 13% | 35% | 21% | 27% |
| $c_s$ | 13% | 40% | 21% | 32% |
| $c_d$ | 13% | 40% | 21% | 32% |
| $d_s$ | 5% | 13% | 8% | 11% |
| $d_d$ | 5% | 13% | 8% | 11% |
| $e_s$ | 5% | 21% | 11% | 16% |
| $e_d$ | 5% | 21% | 11% | 16% |
| i | 5% | 13% | 11% | 16% |
| j | 5% | 27% | 13% | 19% |
| k | 13% | 27% | 16% | 24% |
| u | 8% | 19% | 11% | 16% |
| v | 13% | 24% | 16% | 21% |
| w | 8% | 19% | 11% | 16% |

TIRE TREAD WITH IMPROVED SIPE ON THREE LEVELS AND TIRE

TECHNICAL FIELD OF THE INVENTION

The present invention relates to a tire tread. In particular, it refers to a tread pattern which incorporates an enhanced 3-level sipe geometry that improves the performance of a new tire on dry surfaces whilst maintaining high performance on wet and/or snow-covered surfaces throughout the useful life thereof.

BACKGROUND

Tires are generally fitted with a tread that has grooves extending laterally and/or circumferentially, thereby defining "tread elements" that engage with the ground and that contribute to the overall performance of the tire.

As is known, the presence of grooves that are generally thin and not very wide, called notches or sipes, define voids that make it possible to improve the grip and traction of a tire, especially in wet and/or snow-covered conditions, in the first case contributing to the draining of water and in the latter contributing to the trapping of snow.

To date, the ability of tires to maintain the initial level of performance thereof for as long as possible, especially in wet and/or snow-covered conditions and in consideration of the physiological wear and aging of the materials that constitute them, is the subject of particular attention amongst operators within the sector. Normal tread wear typically results, in fact, in a rapid reduction in the void percentage, and the closer it is to the end of the useful life thereof, the more the tire is subjected to a drastic drop in adhesion in the wet/snow.

To counter this trend, it is known to manufacture tires with sipes having specific profiles wherein the main purpose thereof is to modify the geometric characteristics of the tread and to compensate for the decrease in performance due to the reduction in the void percentage during wear.

In this sense, it is known to model sipes in such a way that appropriate, so-called "hidden" voids remain defined within the tread pattern in order to mitigate the void percentage drop during tire wear and thus reduce the drop in performance on wet and/or snowy surfaces.

The known solutions mentioned above, while managing to maintain good performance in terms of grip and traction on wet and/or snow-covered surfaces during the useful life of the tire, on the other hand entail a decrease in the stiffness of the tread and, therefore, an overall worsening in performance in terms of stiffness, braking capacity and handling on dry and/or smooth surfaces, especially when the tire is new.

For example, US 2012/132337 A1 discloses a sipe consisting of a succession of thick and thin sections, arranged alternately and inclined with respect to the sliding surface of the tread. US 2002/017349 A1 discloses sipes that are characterised by an overall zigzag conformation such as to prevent deformation of the block and to increase the stiffness thereof. EP 2138330 A1 discloses a sipe having opposite faces that are configured to cooperate therebetween and wherein the distance thereof is at a maximum within that region of the tread which is subjected to maximum deflection.

BRIEF DESCRIPTION OF THE INVENTION

The technical problem posed and solved by the present invention is therefore that of overcoming the aforementioned problems and, in particular, of providing a tread with a sipe geometry such as to improve performance on wet and/or snow-covered surfaces as a result of normal wear during the life of the tire without affecting the braking and handling ability of the tire on a dry and/or smooth surface when the tire is new.

This is achieved by means of a tire tread as defined in claim 1.

A further object of the present invention is a tire as defined in claim 7.

Further characteristics of the present invention are defined in the corresponding dependent claims.

The tread according to the present invention is such as to provide optimal performance under wet and/or snow-covered road conditions but, at the same time, to provide the increased stiffness required in the event of a dry road surface.

In other words, the tread of the present invention provides a sipe with an optimised geometry which, not only compensates for the reduction in the volume of the voids due to tire wear, but at the same time manages to favour manoeuvrability and braking capacity on a dry and/or smooth surface, improving the performance under new tire conditions.

For the purposes of the present invention, the term "tread element" refers to a portion of the tread pattern that can be repeated, identically, along the entire length of the tread.

The term "tread component," or simply "component," refers to any block of the tread, regardless of the form and/or positioning thereof.

The term "contact surface" refers to that portion of a surface of a component which comes into contact with the ground during the rolling of the tire.

The term "sipe" refers to a thin and generally narrow groove in a tread component that is obtained by means of the moulding of the tire, and that is particularly intended to improve the performance of the tire on wet and/or snow-covered surfaces.

Other advantages, together with the characteristics and usages of the present invention, will become clear from the following detailed description of the preferred embodiments thereof given purely by way of non-limiting examples.

BRIEF DESCRIPTION OF THE FIGURES

Reference will be made to the drawings in the attached figures, wherein.

DETAILED DESCRIPTION OF EMBODIMENTS OF THE INVENTION

The present invention will be described below with reference to the above figures.

For descriptive simplicity reference will be made hereinafter to a generic tread block. As already mentioned, it is however to be understood that the principle underlying the present invention is applicable to any tread component, whether it is a block or something else.

Figure 1:
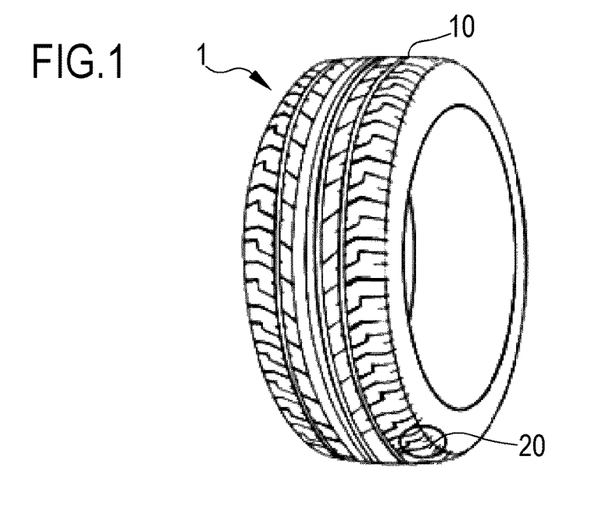
FIG. 1 shows a tire according to the present invention provided with a tread according to the present invention.

With initial reference to FIG. 1, a schematic perspective view is shown of a tire 1 comprising a tread 10 according to a preferred embodiment of the present invention.

Figure 2:
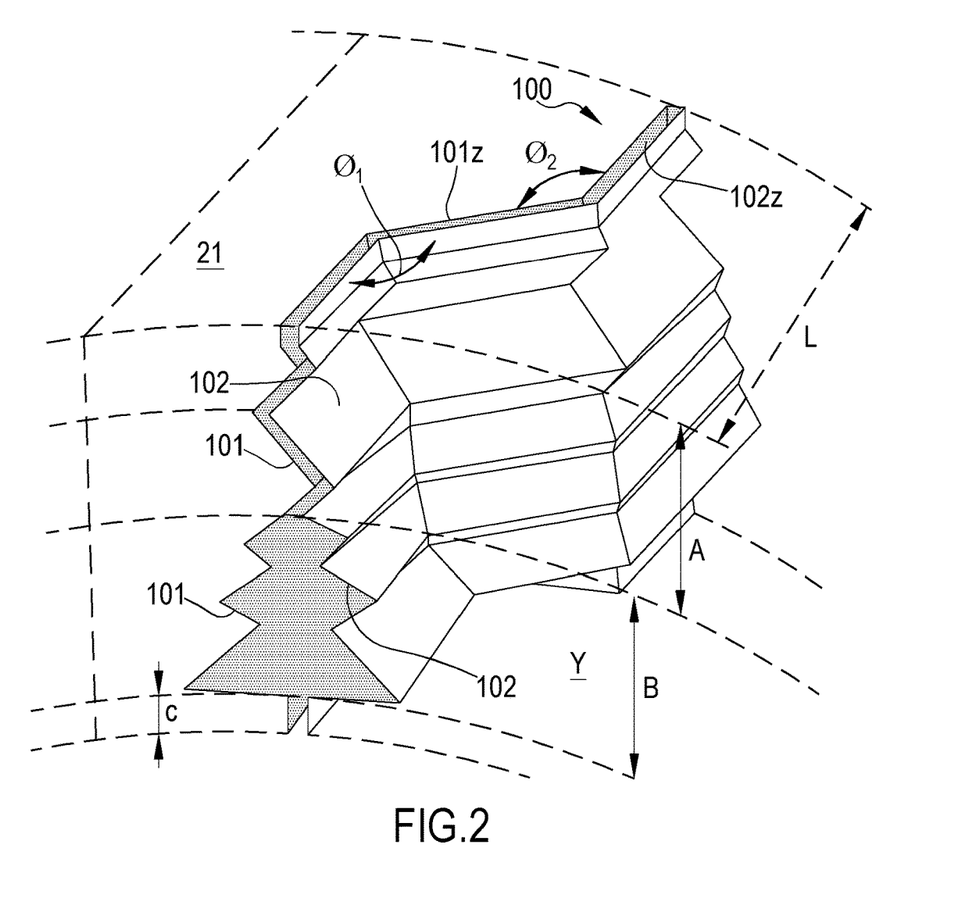
FIG. 2 is an exemplary perspective view of a sipe of a tread component according to the present invention.

In general terms, a tread 10 for a tire 1 comprises a plurality of tread components 20. In particular, FIG. 2 shows an exemplary perspective view of a sipe 100 located within a block 20 of the tread 10 according to the present invention. For visual clarity, the solid portions of the block 20 are not shown.

Each block 20 of the tread 10 has a respective contact surface 21 which, together with the tread, defines the surface of the tread itself that is in contact with the ground.

Figure 3:
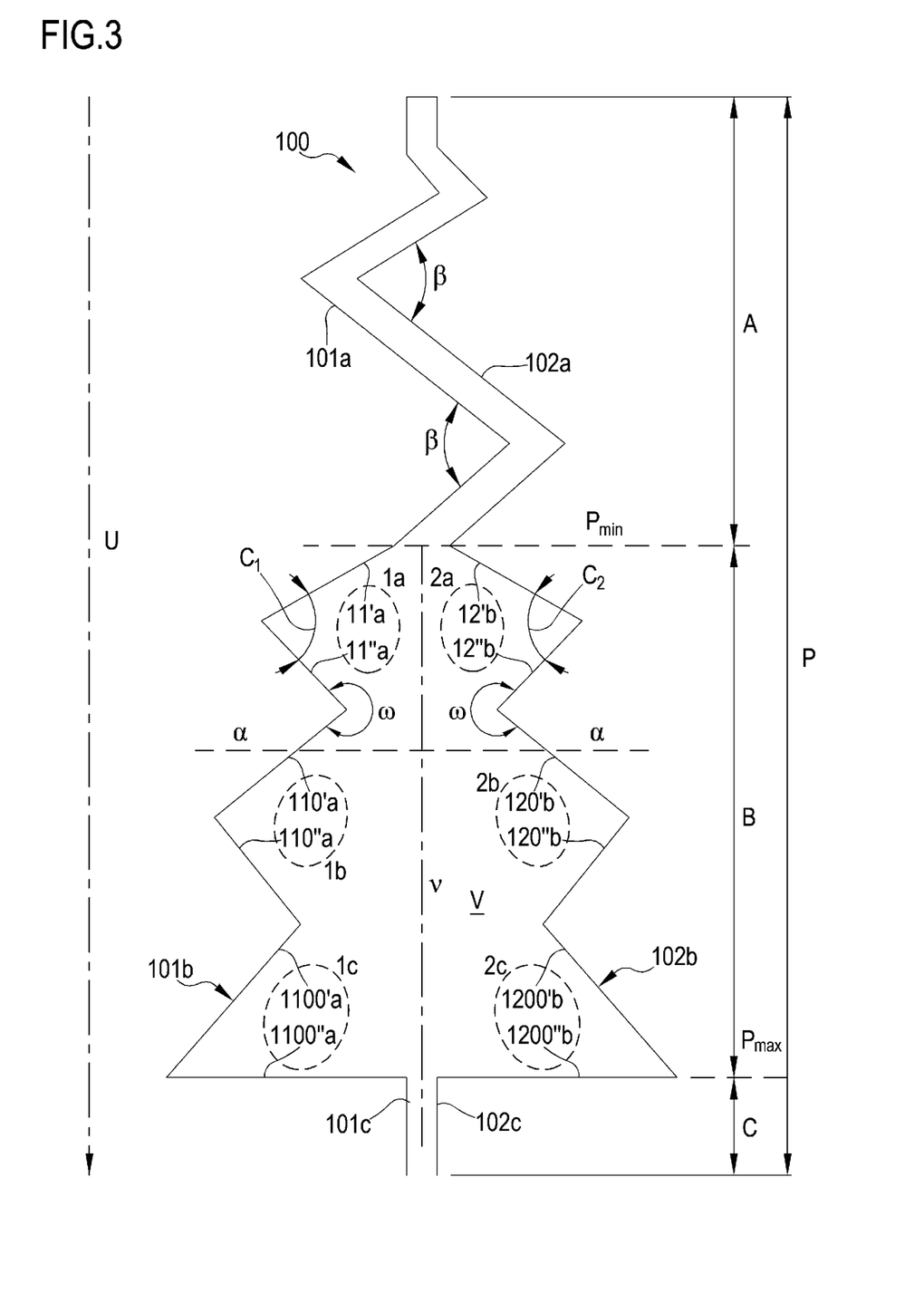
FIG. 3 is a cross-sectional view of the sipe profile of FIG. 2.

According to the present invention and with further reference to FIG. 3, at least one of the blocks 20 of the tread 10 comprises a sipe 100 having a sipe extension L and a sipe depth P, the latter along a direction of wear U that is substantially orthogonal to said contact surface 21. Said direction of wear U is namely a radial direction toward the centre of the tire 1.

In a preferred and non-limiting embodiment, the sipe 100 provides for a longitudinal sipe extension L between opposite ends of said block 20.

It is to be understood that said longitudinal extension L of the sipe 100 does not necessarily coincide with the direction of development of the tread 10, but can be oriented differently depending upon the relative positioning of the block 20 (or other component) within the same tread 10.

As can be seen in FIG. 2, the sipe 100 defines a first face 101 and a second face 102, opposite therebetween, of the component 20 and the sipe depth P along said direction of wear U and comprises a first and a second section, respectively denoted with the references A and C.

Preferably, the first section A is located above, namely externally in the radial direction of the tire, with respect to the second section C, the first section A being the section closest to the contact surface 21 under new or progressive wear conditions of the tire 1.

For convenience, reference will therefore be made to said first section A as the upper section and to said second section C as the lower section.

Although not illustrated in the Figures, the sipe 100 within the depth P thereof may comprise, in preferred embodiments, additional sections located above said first section A along the direction of wear U.

Preferably, the lower section C of the sipe depth P ends at the maximum wear limit of the tread 10 of the tire 1 (skid depth).

Along said direction of wear U, the sipe 100 comprises a further section, or intermediate section B, which connects the first and second sections A, C therebetween.

Preferably, according to the depth P thereof, the sipe 100 comprises, in sequence from a radially outer position to a radially inner position, said first section A, said intermediate section B and said second section C.

As can be seen in FIG. 3, the first and second opposing faces 101, 102 defined by the sipe 100 have corresponding complementary profiles 101a, 102a and 101c, 102c, respectively, along the upper A and lower C sections. Additionally, the first 101 and second 102 faces respectively exhibit a first interference profile 101b and a second interference profile 102b at the intermediate section B and along said wear direction U.

Advantageously, the tread 10 of the invention therefore has at least one component 20 that is characterised by a specific sipe geometry 100, which determines three regions, or levels, that are located at selected and progressive depths along the direction of wear U.

In general terms, these levels can cover different percentages of the depth P of the sipe 100, such that the technical effect conferred by the geometry of each section A, B, C of the sipe 100 is synergistic and balanced in relation to the additional sections thereof, in order to adjust the stiffness and/or durability of the components 20 of the tread 10, thereby optimising the performance of the tire 1 as a function of the type of application required.

Figure 7A:
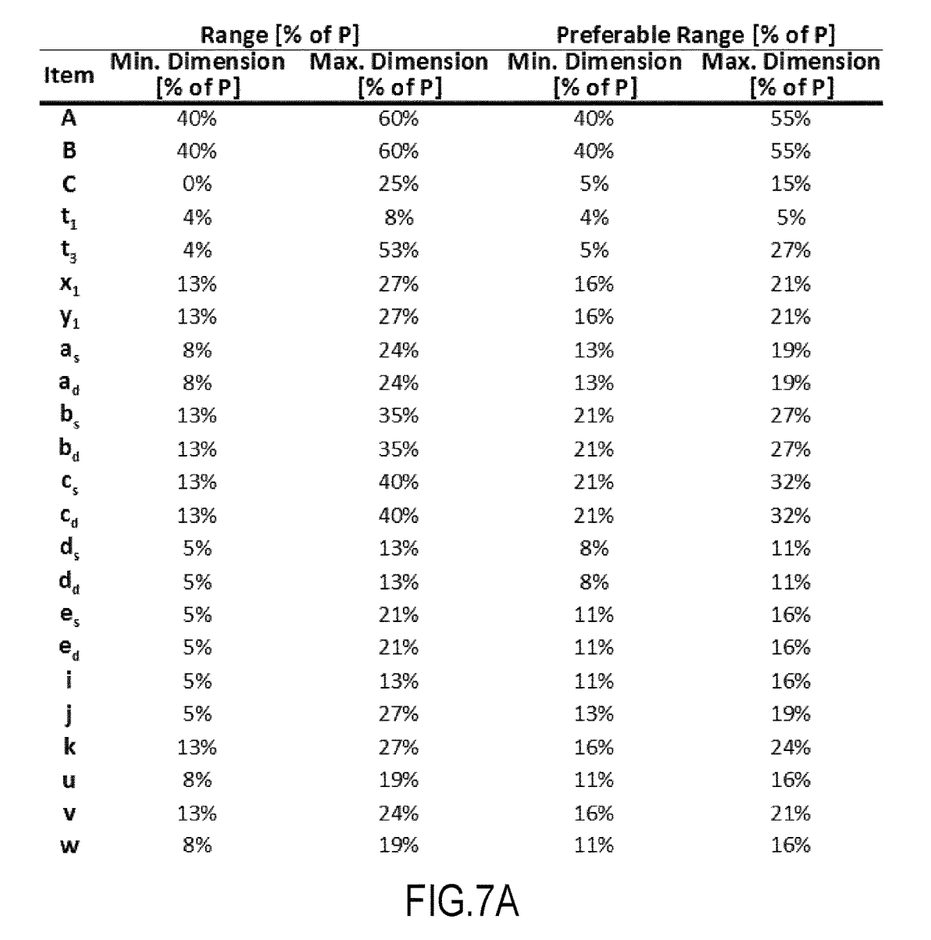
FIG. 7A shows a table wherein the preferred values of the parameters indicated in FIG. 6 are indicated with further reference to preferred reference dimensions relating to a tread component incorporating the sipe profile shown in FIG. 2 as shown in an exemplary schematic view of FIG. 7B The thicknesses and curvatures shown in the above figures should be understood to be purely exemplary and are not necessarily shown in proportion. Furthermore, in these figures some layers/components of the tire may have been omitted for a clearer illustration of the aspects of the present invention.
Figure 7B:
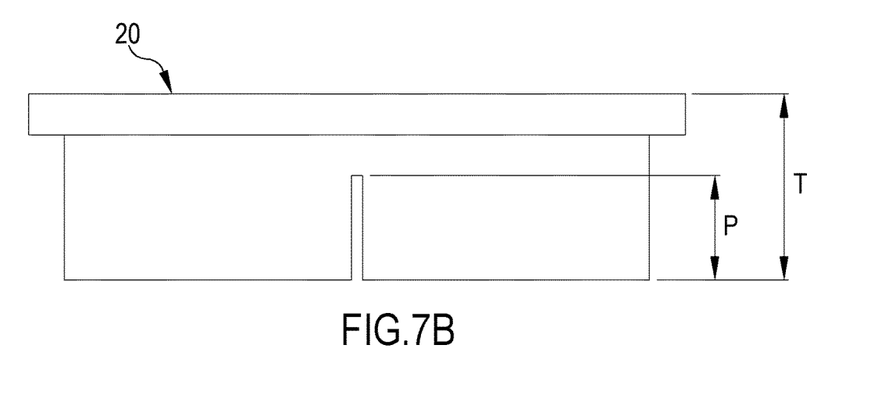

With reference to FIG. 7B, in a preferred application of the invention, at least one component 20 of the tread 10 has an overall height T ranging between 5 mm and 20 mm. In general terms, the sipe depth P, i.e., the sum of the extension of the first section A, of the intermediate section B and of the second section C, is preferably between 40% and 100% of said height T, and even more preferably between 40% and 80% of said height T.

Furthermore, as indicated in the table of FIG. 7A, the first section A can have an extension of between 40% and 60%, preferably between 40% and 55%, of the sipe depth P, the intermediate section B can have an extension between 40% and 60%, preferably between 40% and 55%, of the sipe depth P and the second section C can have an extension of up to 25%, preferably between 5% and 15%, of the sipe depth P.

As mentioned above, the intermediate section B has a first 101b and a second 102b interference profile. With joint reference to FIG. 3 and FIGS. 5A-5C, each of said interference profiles comprises at least two contact surfaces, respectively denoted by the references 11'a, 11"a and 12'b, 12"b, facing one another and configured for reversible mutual contact in response to stress acting upon the block 20.

In the illustrated example, it can be seen how the first and second interference profiles 101b, 102b are spaced therebetween between a minimum depth $P_{min}$ and a maximum depth $P_{max}$ of the intermediate section B, in such a way as to define a region of deformation V, or void, within the block 20. This deformation region V preferably develops along an axis v parallel to said wear direction U.

The aforementioned contact surfaces 11'a, 11"a, 12'b, 12"b face the inside of said deformation region V.

Figure 5A:
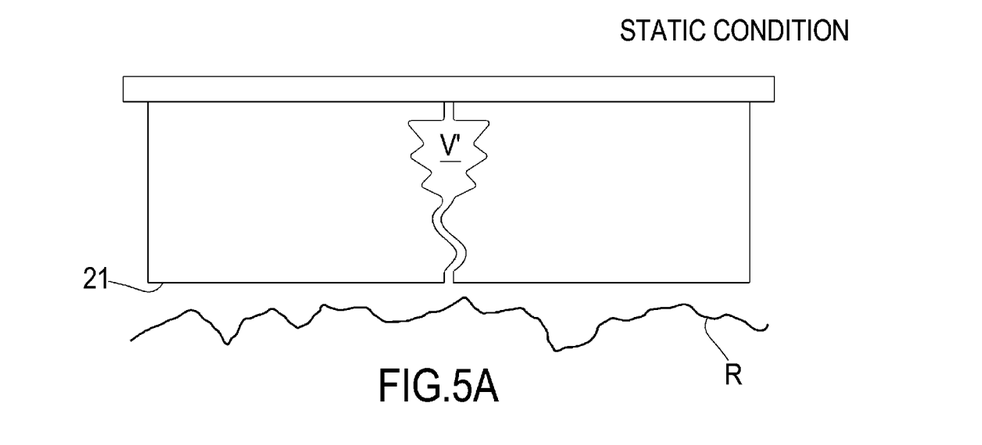
FIGS. 5A, 5B and 5C show a schematic representation of the behaviour of a tread component bearing a sipe according to an embodiment of the present invention, respectively in a static condition, stressed under normal load and under sliding conditions.
Figure 5B:
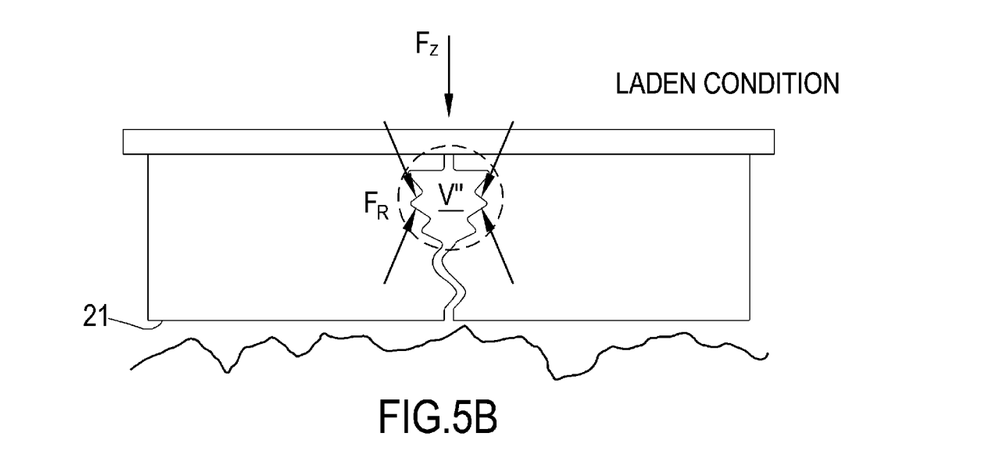
Figure 5C:
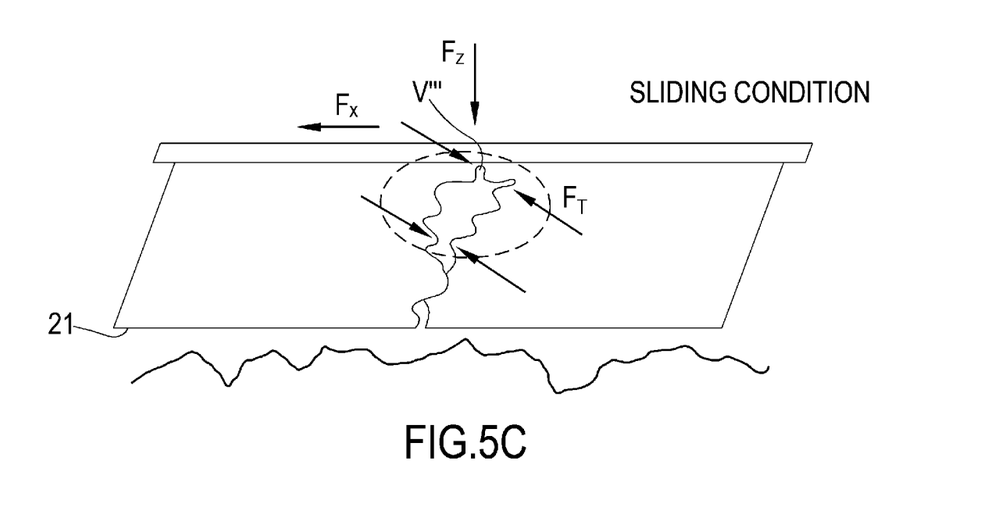

In particular, in FIGS. 5A-5C the behaviour of a block 20 of the tread 10, bearing a sipe 100 according to the preferred embodiment just described, respectively in a static, laden and sliding condition (the latter representing a rolling condition of the tire 1 with a moment of traction or braking).

Figure 4A:
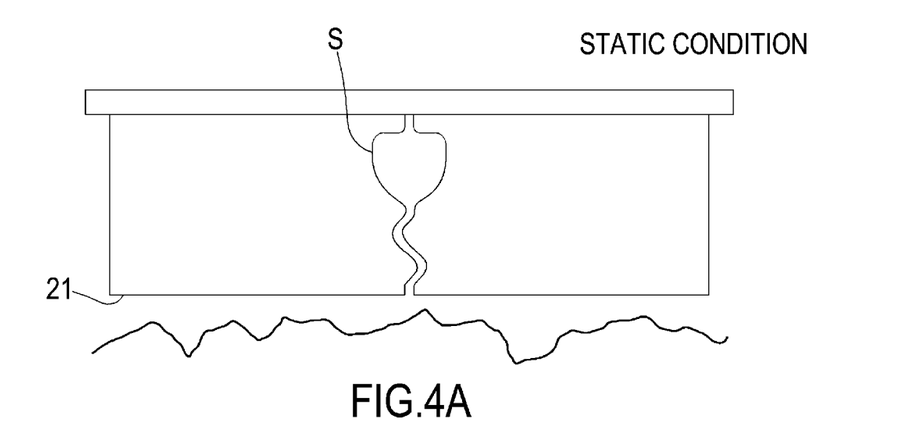
FIGS. 4A, 4B and 4C show a schematic representation of the behaviour of a tread component bearing a sipe according to an embodiment known in the state of the art, respectively in a static condition, stressed under normal load and under sliding conditions.

This behaviour will be compared in the following with the corresponding FIGS. 4A, 4B and 4C which show a schematic representation of the behaviour of a tread component 5 bearing a sipe S according to a different embodiment.

As can be seen in FIG. 5A, in a static condition (for example, in the absence of stress pressing upon the tire 1 and neglecting the weight thereof) the tire rests upon a rolling plane R, the interference profiles 101$b$, 102$b$ of the opposing faces 101, 102 are spaced therebetween and define a first void volume V' of the deformation region V. Under these conditions, substantial differences are not appreciable with the sipe S shown in FIG. 4A, except in terms of the shape of the sipe itself.

Upon application of a load, represented by way of example in FIG. 5B by a force $F_z$, which acts normally, or radially, upon the tire 1 and in particular upon the component (a condition that is representative, for example, of a tire mounted on a stationary vehicle), the latter tends to deform and consequently also the interference profiles 101$b$, 102$b$ of the intermediate section B.

In particular, said profiles 101$b$, 102$b$ deform along a direction substantially corresponding to the direction of the applied stress $F_z$. This deformation direction is represented in FIG. 5B with the four arrows denoted as a whole with the reference FR.

The region of deformation V thus assumes a second volume V″ that is less than the first volume V' that is assumed when the tire 1 is in a static condition.

The pair of contact surfaces 11′$a$, 11″$a$ of the first profile 101$b$ approach one another in a similar way to the pair of contact surfaces 12′$b$, 12″$b$ of the second profile 102$b$. The contact surfaces of a respective pair come into contact and allow for partial reciprocal locking of the interference profiles 101$b$, 102$b$.

Said locking preferably takes place along a radial direction to the contact surface 21 of the tread 10 block 20 along the rolling plane R.

The deformation of the block 20 is reversible and determines a reversible contact between the contact surfaces 11′$a$, 11″$a$, 12′$b$, 12″$b$. This contact can fail in the absence of said stress, in particular radial stress.

Figure 4B:
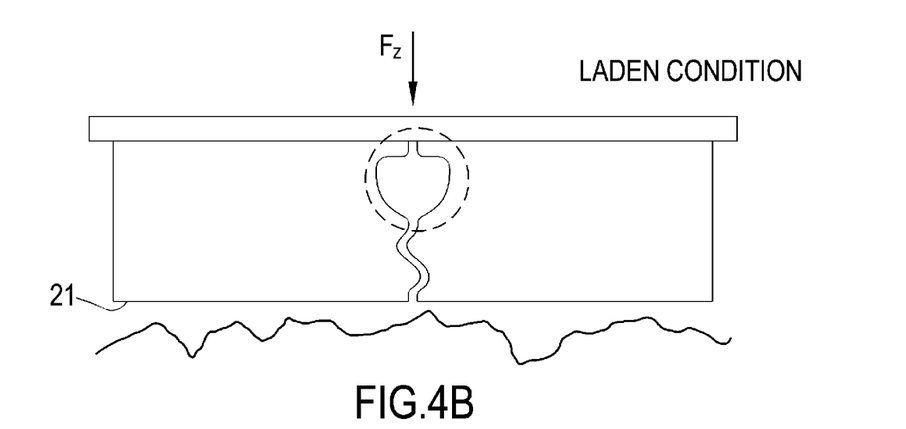

It can be seen that, with reference to the corresponding FIG. 4B, in a sipe S without interference profiles and contact surfaces, said contact cannot occur, nor the associated advantageous technical effects.

According to the invention, the particular geometry of the interference profiles 101$b$, 102$b$ of the intermediate section B results in behaviour of the tread 10 component 20 that can be associated with that of a "spring". In other words, the inventive concept of the present invention advantageously makes it possible to obtain the reciprocal and reversible locking of specific interference profiles 101$b$, 102$b$ of the sipe 100 which, in coming into contact following stress upon the block 20, mitigate the loss of stiffness of the tread 10 due to the deformation of the latter when subjected to stress.

Advantageously, contact surfaces of the first interference profile 101$b$ can come into contact with contact surfaces of the second interference profile 102$b$, favouring an improved locking condition as regards the interference profiles 101$b$, 102$b$ themselves.

This condition occurs, for example, during a rolling (or incipient rolling) condition of the tire 1 whereupon, in addition to a radial stress ($F_z$), a tangential stress, denoted by way of example with the reference $F_x$, also acts. This rolling condition is schematically illustrated in FIG. 5C.

Advantageously, and again with reference to the example illustrated in FIG. 3, the contact surfaces 11′$a$, 11″$a$, 12′$b$, 12″$b$ of the respective interference profiles 101$b$, 102$b$ can therefore be consecutive and incident therebetween, thereby forming corresponding concavities Ci, C 2. The concavity formed by each pair of contact surfaces is placed at a maximum (relative) distance of a respective interference profile 101$b$, 102$b$ with respect to the development axis v of the deformation region V.

Similarly, for each interference profile, a contact surface 11″$a$ of a first pair of contact surfaces defines, together with a distinct contact surface 110″$a$ that is consecutive and belonging to a second pair of contact surfaces, an obtuse angle ω facing into said region of deformation V.

Preferably, therefore, the opposite faces 101, 102 at the intermediate section B, comprise respective interference profiles 101$b$, 102$b$ shaped in a "zig-zag" or "wavy" manner that define concavities and "ridges". This conformation favours the approaching of the contact surfaces of the opposing interference profiles 101$b$, 102$b$ and makes it possible to generate local shear forces which contribute to the mutual locking thereof along a substantially tangential deformation direction of the block 20.

The aforementioned local shear forces are represented in FIG. 5C with the four arrows denoted as a whole with the reference $F_T$.

The region of deformation V thus assumes a third volume V‴ which is less than the second volume V″ that is assumed when the tire 1 is in a static condition.

This configuration advantageously entails a further improvement in the performance of the tire in terms of the stiffness of the tread 10 and of the coefficient of friction under dry conditions.

Figure 4C:
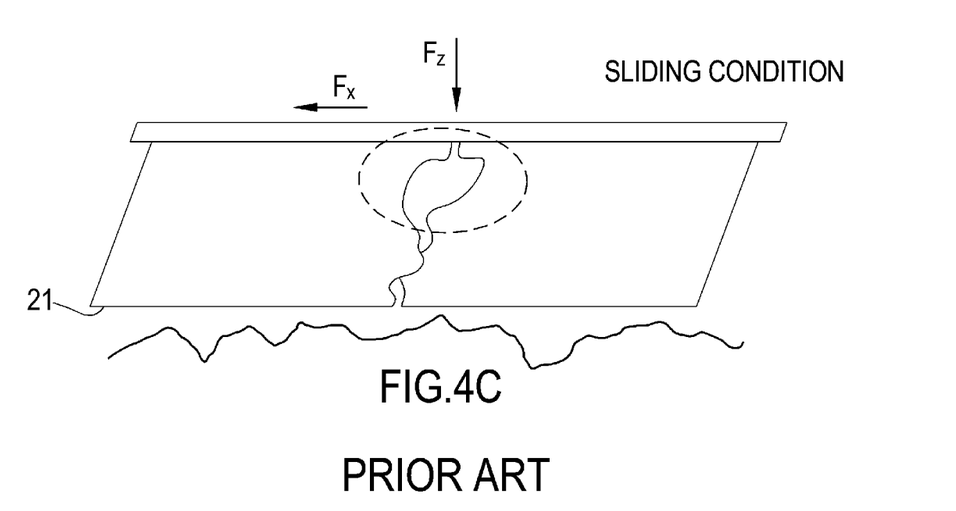

The absence is noted, with reference to the corresponding FIG. 4C, of any possible contact, and therefore of reciprocal locking, between the opposite faces of the sipe S, at least for the entire extension of the depth of the sipe, insofar as it does not have the specific shapes, and therefore the associated advantageous technical effects, proposed with the present invention.

Returning again to FIG. 3, according to a preferred embodiment of the invention, the mutual distance between the first and second interference profiles 101$b$, 102$b$ is less at the minimum depth $P_{min}$ of the intermediate section B compared to the mutual distance thereof, at the maximum depth $P_{max}$.

In this way it is possible to increase the void percentage of the tread 10 and to further confer better performance to the tire 1 on wet and/or snow-covered road surfaces.

Advantageously, the combination of a geometry which provides, within a specific intermediate section B of the sipe 100, an overall "distancing" of the opposite faces 101, 102 which present therein interference profiles 101$b$, 102$b$ shaped in a wavy (or "zig-zag") manner with contact surfaces configured for reversible contact, makes it possible to maintain high performance on wet and/or snow-covered surfaces throughout the useful life of the tire whilst, at the same time, providing adequate stiffness on a dry and/or smooth surface even when the tire is new, in accordance with the behaviour described above with reference to FIGS. 4A-4C and 5A-5C.

In other words, according to an advantageous aspect of the invention, the overall "distancing" of the interference profiles 101$b$, 102$b$ at the intermediate section B, makes it possible to compensate for the void percentage reduction of the tread 10 owing to the wear progression, which progressively consumes the depth P of the sipe 100. In this way, as the road surface contact area decreases, the void percentage increases and thus slows the inevitable loss of performance of the tire 1 on wet and/or snow-covered surfaces. In fact the wear of the tire 1 typically involves a decrease in the void percentage offered by the sipe 100, which gradually consumes the depth P thereof along the direction of wear U. This void reduction is mitigated by the distancing of the interference profiles 101b, 102b at the intermediate section B, in particular in considering the mutual distances thereof at the minimum depth $P_{min}$ and at the maximum depth $P_{max}$.

The above is advantageously combined with the presence of interference profiles 101b, 102b configured for reciprocal and reversible locking along directions of deformation, preferably radial and tangential, of the component 20 of the tread 10, which interferences compensate for the inevitable decrease in stiffness of the tire 1 (especially when new) due to a geometry which, in a preferred embodiment of the invention, mitigates overall the reduction of voids precisely required to obtain the aforementioned performance on wet and/or snow-covered surfaces.

Figure 6:
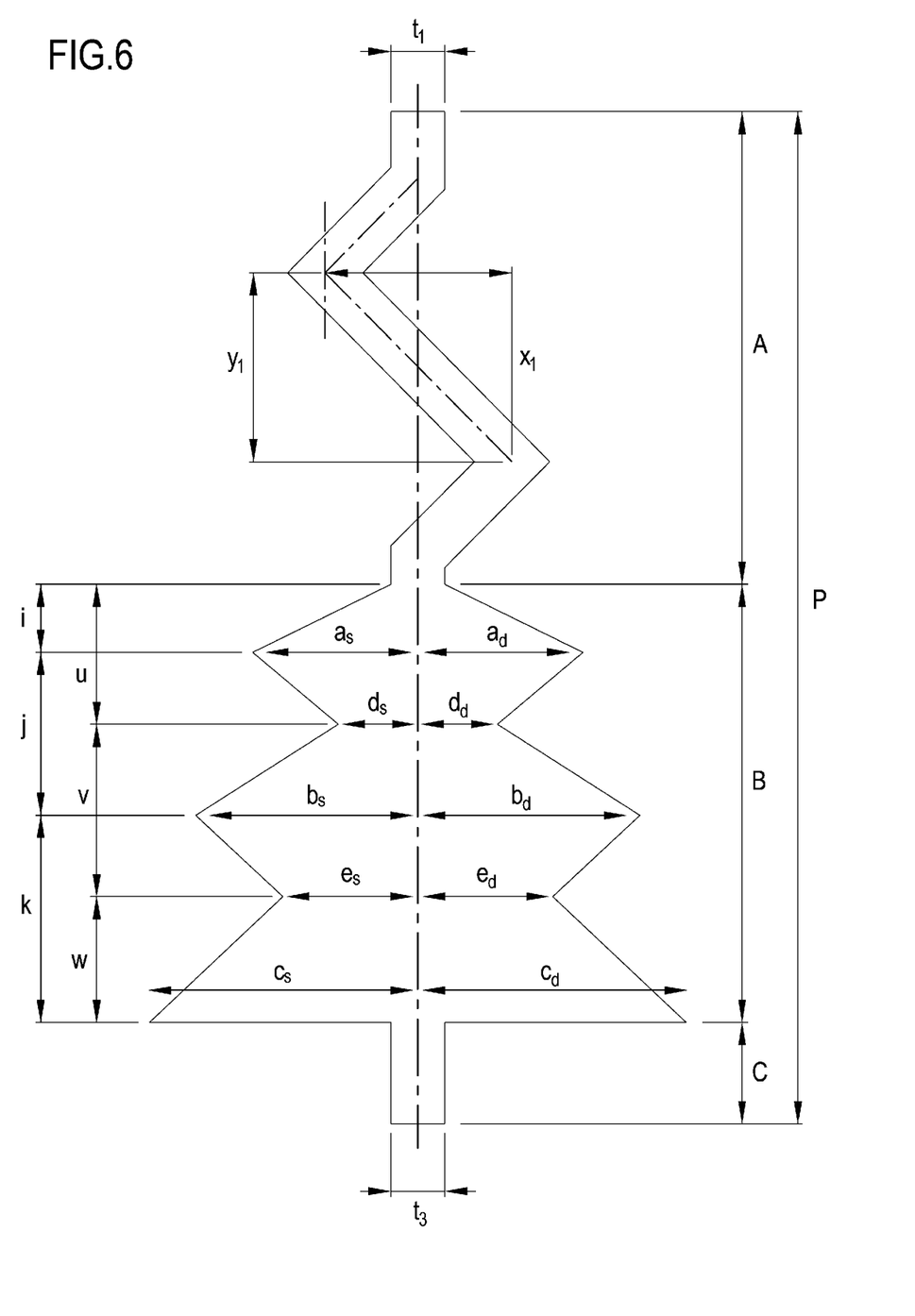
FIG. 6 shows the sectional view of FIG. 3 wherein preferred significant parameters of the sipe profile are indicated.

In view of FIG. 7B and the table of FIG. 7A, reference is now made to FIG. 6, which shows a sectional view of the sipe profile 100 wherein some significant parameters are indicated according to a preferred embodiment of the invention with reference to the example of FIG. 3.

In the illustrated example, along the intermediate section B, each interference profile 101b, 102b preferably comprises three pairs of contact surfaces, respectively denoted by the references (11'a, 11"a) for the first pair, with the references (110'a, 110"a) for the second pair, with the references (1100'a, 1100"a) for the third pair, in relation to the first interference profile 101b. Similarly, for the second interference profile 102b, with the references (12'b, 12"b) for the first pair, with the references (120'b, 120"b) for the second pair, with the references (1200'b, 1200"b) for the third pair.

For simplicity of explanation, hereinafter, reference will be made to the aforementioned three pairs of the first profile 101b, respectively with the references 1a, 1b, 1c and to the above three pairs of the second profile 102b, respectively with the references 2a, 2b, 2c.

In this example, the interference profiles 101b, 102b have different maximum (relative) distances from said development axis v corresponding to each of said three pairs of contact surfaces. In particular, for the first interference profile 101b and at the first pair 1a, it has a maximum (relative) distance $a_s$ that is less than the maximum (relative) distance $b_s$ corresponding to the second pair 1b. Corresponding to the third pair 1c, the first interference profile 101b has a maximum (relative) distance $c_s$ that is greater than the maximum (relative) distance $b_s$ corresponding to the second pair 1b.

Similar considerations preferably apply to the maximum (relative) distances of the second interference profile 102b from said development axis v, denoted with the references to $a_d$, $b_d$, $c_d$, corresponding to the relative pairs of contact surfaces 2a, 2b, 2c.

Similarly, for both interference profiles 101b, 102b the respective minimum (relative) distances from said development axis v can be identified. Specifically, said minimum (relative) distances are at respective obtuse angles ω defined between a contact surface 11"a (or 12"b) respectively, of a first pair 1a (or 2a) with a distinct contact surface 110'a (or 120'b), consecutive thereto, and relative to a second pair 1b (or 2b).

In FIG. 6, said minimum (relative) distances are denoted by the references $d_s$, $e_s$ for the first interference profile 101b and with the references $d_d$ and $e_d$ for the second interference profile 102b.

As can be seen in the illustrated embodiment, the development axis v of the intermediate section B is an axis of symmetry in relation to the first and second interference profiles 101b, 102b.

In particular, said maximum (relative) distance and, even more preferably also the minimum (relative) distance, increases along said wear direction U.

Furthermore, it is possible to identify a maximum radial extension of each pair 1a, 1b, 1c, 2a, 2b, 2c of contact surfaces along a direction parallel to the sipe depth P within the intermediate section B.

In the event that said development axis v is an axis of symmetry, specular pairs of opposite interference profiles, i.e., the pairs 1a, 2a, the pairs 1b, 2b, the pairs 1c, 2c preferably have the same radial extension. In FIG. 6, said radial extensions are denoted with the references u, v, w, respectively, for the pairs 1a, 2a, the pairs 1b, 2b and the pairs 1c, 2c.

The sum of the maximum radial extensions of the pairs of surfaces of a respective interference profile ranges between the minimum depth $P_{min}$ and the maximum depth $P_{max}$ of the intermediate section B.

The table shown in FIG. 7A indicates the values that the aforesaid parameters can assume for the sipe geometry 100 according to the present invention with reference to preferred intervals.

Considering now the upper section A, the first and second opposing faces 101, 102 identify respective first profiles 101a, 102a in a plane γ that is orthogonal to the direction of longitudinal extension, or sipe extension L.

Preferably, said respective first profiles 101a, 102a have a pattern such as to intersect, in said orthogonal plane γ, with a straight line at at least two distinct points along said first section A.

As can be seen in the illustrated example, the pattern of the first profiles 101a, 102a is preferably a "zig-zag" pattern, wherein crests (or corresponding valleys) may have different extents. Crests (or valleys) are defined by consecutive sections of said first profiles 101a, 102a wherein each crest (or valley) is preferably defined by two consecutive sections that form therebetween an internal angle β of between 70° and 135°.

With further reference to FIG. 6, it is possible to identify the distance between two crests (or valleys) of consecutive sections along a direction parallel to the direction of wear U, denoted by the reference $\gamma_1$. Similarly, it is possible to identify the distance between two crests (or valleys) of consecutive sections along a direction orthogonal to the direction of wear U, said distance denoted by the reference $x_1$.

Furthermore, in FIG. 6, the mutual distance between said first profiles 101a, 102a is denoted by the reference $t_1$.

The table shown in FIG. 7A shows the values that the aforesaid parameters can assume for the sipe geometry 100 according to the present invention with reference to preferred intervals.

A first section A of the sipe 100 confers elevated rigidity to the component 20, thereby optimizing the performance of the tire 1 on a dry road surface, especially when new.

With joint reference to FIG. 2 and FIG. 3, the first and second opposite faces 101, 102 preferably identify further respective profiles with a surface α parallel to the contact surface 21.

For example, with reference to the first section A of the sipe 100, the first and second opposing faces 101, 102 identify profiles that extend along the direction of longitudinal extension L of the sipe 100 and have a pattern such as to be able to intersect, at at least two distinct points, a straight line lying on said surface α. These profiles are denoted in FIG. 1 with the references 101z, 102z.

In this way a sipe geometry 100 is obtained with a three-dimensional progression wherein the elevated stiffness of the component 20 can be maintained by virtue of the interpenetration—during stressing—of the profiles of said first and second opposing faces 101, 102. That is to say, that the opening of the block 20 is rendered difficult when the component is new and subjected to shear stress, for example during braking, as compared to a planar geometry.

Along said direction of longitudinal extension L, the aforesaid profiles 101z, 102z may have a zig-zag pattern, similar to that described previously for the first profiles 101a, 102a. Also in the case, as can be seen in the illustrated example, crests (or valleys) are defined by consecutive sections of said profiles 101z, 102z wherein each crest (or valley) is preferably defined by two consecutive sections that form therebetween an internal angle ϕ of between 135° and 180°.

Both the first profiles 101a, 102a and the further profiles 101z, 102z along the direction of longitudinal extension L may comprise more than two consecutive sections such that they form two or more internal angles, respectively β and ϕ. In embodiments, the profiles 101z, 102z can determine at least a first internal angle $\phi_1$ of a different extent in relation to a second inner angle $\phi_2$.

In a similar way to that previously described for the upper section A, the lower section C of the sipe depth P comprises second profiles 101c, 102c. Said second profiles are obtained within the aforementioned orthogonal plane γ in relation to the sipe extension L. Preferably, said second profiles 101c, 102c have a substantially rectilinear pattern, for instance parallel therebetween. With reference to FIG. 6, the mutual distance thereof is denoted by the reference $t_3$ and the preferred values of said mutual distance are indicated in the table of FIG. 7A.

According to a preferred embodiment, the lower section C also extends along the sipe extension L, according to that described above for the upper section A.

In relation to a first aspect, a lower section C of the sipe depth P, as described above, keeps the rigidity of the tread 10 of the invention low when worn, thereby conferring good grip to the tire 1 on a wet and/or snow-covered road surface, also when the tire is close to the end of the life thereof.

By means of the provision of a lower section C within the tread 10, it is additionally possible according to the invention to obtain different values for the overall rigidity of the block 20, also when the upper section A of the sipe 100 is completely worn. This adjustment can be obtained by modulating the relative extension percentage of the intermediate section B and lower section C in relation to the sipe depth P, as described above.

In terms of the production process, advantageously, the lower section C is sufficiently extended in order to facilitate the separation of the opposing faces 101, 102 of the sipe 100 during the process of extracting the mold from the tread 10 without penalising the rigidity of the tire 1 when new.

The present invention has heretofore been described with reference to the preferred embodiments thereof. It is intended that each of the technical solutions implemented in the preferred exemplary embodiments described herein can advantageously be combined in different ways therebetween in order to give form to other embodiments which belong to the same inventive nucleus and that all fall within the scope of protection afforded by the claims recited hereinafter.

The invention claimed is:

1. A tread for a tire, comprising:
a plurality of tread components each having a respective contact surface, wherein at least one of the plurality of tread components comprises a sipe defining first and second opposing faces of the at least one tread component, the sipe having a sipe depth along a radial direction,
wherein the sipe depth comprises a first and a second section and the first and second opposing faces have corresponding complementary profiles along the first and second section,
wherein the first and second opposing faces further have a respective first and second interference profile in correspondence with an intermediate section linking the first and second section to each other,
wherein each of the first and second interference profile comprises three pairs of contact surfaces facing each other and configured to a reversible mutual contact such that the three contact surfaces of the first interference profile reversibly contact each other and the three contact surfaces of the second interference profile reversibly contact each other in response to a load acting on the at least one component,
wherein the first and second interference profile are spaced between a minimum depth and a maximum depth of the intermediate section in such a way as to define a deformation region of the at least one component which develops along a development axis parallel to the radial direction,
wherein the development axis is an axis of symmetry with respect to a development of the first and second interference profile,
wherein the first and second interference profiles provide for a different maximum distance from the development axis at each of the three pairs of contact surfaces, and
wherein the maximum distance increases along the radial direction.

2. The tread of claim 1, wherein the mutual distance between the first and second interference profile is smaller at the minimum depth than their mutual distance at the maximum depth.

3. The tread of claim 1, wherein the at least two contact surfaces are consecutive and incident to each other to form a concavity at a maximum distance of a respective interference profile with respect to the development axis.

4. The tread of claim 1, wherein the sipe depth comprises in sequence the first section, the intermediate section, and the second section.

5. A tire comprising a tread, wherein the tread comprises:
a plurality of tread components each having a respective contact surface, wherein at least one of the plurality of tread components comprises a sipe defining first and second opposing faces of the at least one tread component, the sipe having a sipe depth along a radial direction,
wherein the sipe depth comprises a first and a second section and the first and second opposing faces have corresponding complementary profiles along the first and second section,
wherein the first and second opposing faces further have a respective first and second interference profile in correspondence with an intermediate section linking the first and second section to each other, wherein each of the first and second interference profile comprises three pairs of contact surfaces facing each other and configured to a reversible mutual contact such that the two contact surfaces of the first interference profile reversibly contact each other and the two contact surfaces of the second interference profile reversibly contact each other in response to a load acting on the at least one component, wherein the first and second interference profile are spaced between a minimum depth and a maximum depth of the intermediate section in such a way as to define a deformation region of the at least one component which develops along a development axis parallel to the radial direction, wherein the development axis is an axis of symmetry with respect to a development of the first and second interference profile, wherein the first and second interference profiles provide for a different maximum distance from the development axis at each of the three pairs of contact surfaces, and wherein the maximum distance increases along the radial direction.

6. The tire of claim 5, wherein the mutual distance between the first and second interference profile is smaller at the minimum depth than their mutual distance at the maximum depth.

7. The tire of claim 5, wherein the at least two contact surfaces are consecutive and incident to each other to form a concavity at a maximum distance of a respective interference profile with respect to the development axis.

8. The tire of claim 5, wherein the sipe depth comprises in sequence the first section, the intermediate section, and the second section.

* * * * *